US008990393B2

(12) United States Patent
Rizk

(10) Patent No.: US 8,990,393 B2
(45) Date of Patent: Mar. 24, 2015

(54) SYSTEM AND METHOD FOR MANAGING RELATIONSHIPS WITH INDEPENDENT MULTI-DIMENSIONAL GROUPING, INDIVIDUALIZED PRIVILEGES, AND INTERACTIVE FEEDBACK IN A SOCIAL NETWORK

(76) Inventor: Henri Rizk, Jersey City, NJ (US)

( * ) Notice: Subject to any disclaimer, the term of this patent is extended or adjusted under 35 U.S.C. 154(b) by 349 days.

(21) Appl. No.: 13/079,153

(22) Filed: Apr. 4, 2011

(65) Prior Publication Data

US 2011/0258316 A1    Oct. 20, 2011

Related U.S. Application Data

(60) Provisional application No. 61/325,635, filed on Apr. 19, 2010.

(51) Int. Cl.
*G06F 15/173* (2006.01)
*G06Q 30/02* (2012.01)

(52) U.S. Cl.
CPC ..................................... *G06Q 30/02* (2013.01)
USPC ......................................... 709/225; 709/223

(58) Field of Classification Search
CPC ..... G06Q 30/02; G06Q 10/10; G06Q 10/109; G06Q 10/00; G06Q 30/00; G06Q 50/01; G06F 21/31; H04L 9/32; H04L 12/1818; H04L 12/588; H04L 51/32; H04L 67/306
USPC .................................................. 709/223, 225
See application file for complete search history.

(56) References Cited

U.S. PATENT DOCUMENTS

| | | | |
|---|---|---|---|
| 6,073,105 A | 6/2000 | Sutcliffe et al. |
| 7,069,308 B2 | 6/2006 | Abrams |
| 7,099,862 B2 | 8/2006 | Fitzpatrick et al. |
| 7,117,254 B2 | 10/2006 | Lunt et al. |
| 7,177,880 B2 | 2/2007 | Ruvolo et al. |
| 7,188,153 B2 | 3/2007 | Lunt et al. |
| 7,246,164 B2 | 7/2007 | Lehmann et al. |
| 7,359,894 B1 | 4/2008 | Liebman et al. |
| 7,451,161 B2 | 11/2008 | Zhu et al. |
| 7,596,597 B2 | 9/2009 | Liu et al. |

(Continued)

*Primary Examiner* — Wing F Chan
*Assistant Examiner* — Padma Mundur

(57) ABSTRACT

A system and method for managing relationships in a social network with independent multi-dimensional groupings, individualized privileges & interactive feedback. The contributing member can assign a privilege level from a sliding scale of at least three levels for each item of information, represented as $C_1, C_2, C_3, \ldots C_N$. The contributing member then grants direct privilege levels as they make new friends or grants indirect privilege levels when they join groups or networks. When a requesting user (T) wishes to see contributed information, their privilege level (L) with respect to the contributing member is accessed. The system retrieves all items of information (C), and selectively displays those items of information which have been assigned a privilege level $C_1, C_2, C_3, \ldots C_N$ matching or less than the privilege level granted to the requesting member $T_L$. A contributing member can also chose to allow 'friends of friends' to inherit the privilege level assigned to them by their friends so that 'friends of friends' can be granted access to their private information despite the lack of direct connection.

14 Claims, 19 Drawing Sheets

(56) References Cited

U.S. PATENT DOCUMENTS

| | | |
|---|---|---|
| 2005/0159998 A1* | 7/2005 | Buyukkokten et al. ......... 705/11 |
| 2005/0198031 A1* | 9/2005 | Pezaris et al. ..................... 707/9 |
| 2005/0209999 A1* | 9/2005 | Jou .................................. 707/2 |
| 2005/0210409 A1 | 9/2005 | Jou |
| 2005/0267766 A1* | 12/2005 | Galbreath et al. ................. 705/1 |
| 2007/0160970 A1* | 7/2007 | Kaplan ......................... 434/350 |
| 2009/0240771 A1* | 9/2009 | Capobianco .................. 709/204 |
| 2010/0037288 A1* | 2/2010 | Carraher et al. .................. 726/1 |
| 2010/0144318 A1* | 6/2010 | Cable ......................... 455/412.1 |
| 2010/0257577 A1* | 10/2010 | Grandison et al. ................ 726/1 |

* cited by examiner

Figure 9:

| My networks | My contacts | Creation | Last update | View | |
|---|---|---|---|---|---|
| IfcTESTEURS | 5 | 03/27/2010 | 03/29/2010 | | 922 |
| Family | 1 | 03/29/2010 | 03/29/2010 | | 924 |

MY CONTACTS (BY GROUPS) 912

*Members I have invited into my networks* 914

I have invited a total of 5 members in 2 networks 918 — 916
— 920

Figure 10:

MY CONTACTS (BY MEMBERS) 1012

*Members I have invited into my networks* 1014

✓ Denotes members who have accepted my invitation  1016
✗ Denotes members who have not accepted my invitation I have invited a total of 5 members in 2 networks 1018

Previous page   1 → 5 / 5   Next page   — 1020

| My contacts | My networks | Privilege granted to my contacts | Privileges granted to affiliated members | Send an email | See profile | Invite Status | |
|---|---|---|---|---|---|---|---|
| Amélie Cxxxx | IfcTESTEURS | Medium-High | Low | | | ✗ | 1024 |
| Amy Lxxxx | IfcTESTEURS | High | Low | | | ✗ | 1026 |
| Joelle Lxxxx | IfcTESTEURS Family | Medium-High | Inherit Joelle's | | | ✓ | 1028 |
| Marie-france Lxxxx | IfcTESTEURS | High | Low | | | ✗ | 1030 |
| Mike-Paul Sxxxx | IfcTESTEURS | Medium-High | Low | | | ✓ | 1032 |

Figure 11:

MY DIRECT AFFILIATIONS (RECENT INVITATIONS) 1112

The networks I have been invited into by other members 1114

✓ My Contacts: Indicates members who have invited me into their networks and whom I have accepted their invitation.
✗ Inviting Members: Indicates members who have invited me into their networks and whose invitation I haven't accepted.   } 1116

② How to add or remove a member from my networks?

You have received 5 invitations
Below, the results of your selection:   1118
You have been invited by 5 members in 6 networks Previous page          1 → 5/5          Next page   1120

| Member's name | Network's name | Privilege received | Privilege granted | Send an email | View profile | Network status | |
|---|---|---|---|---|---|---|---|
| Oscar Lxxxx (2011-01-06) | FrancophileFriends | Low-Medium | Low(d) | ✉ | 👤 | ✗ | 1124 |
| Sylvianne L (2010-08-04) | PfrTESTEURS | Medium-High | Medium-High | ✉ | 👤 | ✓ | 1126 |
| Amy L (2010-07-28) | InterContinental | Medium-High | High | ✉ | 👤 | ✓ | 1128 |
| Joelle L (2010-03-30) | Family GroupTestIFC | Full | Medium-High | ✉ | 👤 | ✓ | 1130 |
| Mike-Paul S (2010-03-29) | IfcTesteur | Medium-High | Medium-High | ✉ | 👤 | ✓ | 1132 |

(a) Default: Low for Supporter Members, Medium-High for Active Members
(b) Inherited

Figure 12:

MY PUBLISHED PROFILE 1112

1214

| Privilege level | Members types | View my profile | |
|---|---|---|---|
| Low | Supporter Members | Click HERE | 1218 |
| Low-Medium | Co-workers, Neighbors & Classmates | Click HERE | 1220 |
| Medium | General Acquaintances | Click HERE | 1222 |
| Medium-High | Active Members | Click HERE | 1224 |
| High | Affiliated & Potential Friends | Click HERE | 1226 |
| Full | Close Friends & Family | Click HERE | 1228 |

(1216 above header row)

Figure 13:

PRIVACY & PRIVILEGES SETTINGS 1312

| PRIVILEGE LEVELS | Low<br>Supporter<br>Members | Low-Medium<br>Co-workers, Neighbors<br>& Classmates | Medium<br>General<br>Acquaintances | Medium-High<br>Active<br>Members | High<br>Affiliated &<br>Potential<br>Friends | Full<br>Close<br>Friends &<br>Family | |
|---|---|---|---|---|---|---|---|
| Last name private? | Yes | Yes | Yes | No | No | No | 1318a |
| Birth year private? | Yes | Yes | Yes | No | No | No | 1318b |
| Birth day/month private? | Yes | No | No | No | No | No | |
| Birth citizenship private? | No | No | No | No | No | No | |
| Birth country private? | No | No | No | No | No | No | |
| City of residence private? | No | No | No | No | No | No | |
| Phones private? | Yes | Yes | Yes | Yes | Yes | No | |
| Graduation years confidential? | No | No | No | No | No | No | |
| Education confidential? | Yes | Yes | Yes | No | No | No | |
| Current professional information confidential? | No | No | No | No | No | No | |
| Past professional information confidential? | No | No | No | No | No | No | 1318n |
| Receive emails? | No | Yes | Yes | Yes | Yes | Yes | 1320 |

Figure 14:

PROFILE VIEWS 1412                                    ─ 1410

- MEMBERS' MONTHLY VIEWS                              1414

| Year | Jan | Feb | Mar | Apr | May | Jun | Jul | Aug | Sep | Oct | Nov | Dec | Total |
|------|-----|-----|-----|-----|-----|-----|-----|-----|-----|-----|-----|-----|-------|
| 2010 | -   | -   | 4   | -   | -   | -   | -   | -   | -   | -   | -   | -   | 4     |

- VIEWS PER COUNTRY    1416

| Country | Number of views | % |
|---------|-----------------|------|
| United States | 3 | 75.0 |
| France | 1 | 25.0 |
| TOTAL | 4 | 100.0 |

- MEMBERS' VIEWS       1418

| 2010-03-30 | Joelle Lxxxx | |
| | Amélie Cxxxx | |
| 2010-03-29 | Mike-Paul Sxxxx | |
| 2010-03-27 | Joelle Lxxxx | |

Figure 16:

RATE A MEMBER 1612 — 1610

*Rate and/or Recommend/Blame Mike-Paul S* 1614

*Your ratings are confidential but your recommendation/blame are public*
(•) Required fields

| | | |
|---|---|---|
| Friendliness: | 2.0 | ❓ |
| Sociability: | 2.0 | ❓ |
| Attractiveness: | 3.0 | ❓  1616 |
| Intelligence: | 2.0 | ❓ |
| Trustworthiness: | 2.0 | ❓ |
| How do you know this member? | Met during a francophile event | (•) |
| Explain your ratings: | [text box] | (•)  1618 |

Recommend/Blame?  ○ Give a recommendation   ● Give a blame   ○ Neither  1620

Recommendation/Blame:
```
Mike-Paul has displayed very crude social
skills
```
1622

Submit   Clear  1624

MY RECOMMENDATIONS 1712

| Number of recommendations (R) | 1 |
|---|---|
| Number of blames (B) | 1 |
| Number of blocks (V) | 0 |

1714

1716

| Date | Member | R/B/V | Recommendation/Blame | |
|---|---|---|---|---|
| 2010-04-03 | Mike-Paul S | B | Mike-Paul has displayed very crude social skills | 1718 / 1720 |
| 2010-04-03 | Joelle L | R | An exceptional woman on any scale! | 1722 |

Figure 19:

NEW MEMBERS DIRECTORY 1912

This directory lists the 150 most recent members 1914

Total members displayed: 50
Total members in this directory: 150
Total members: 1,271

1916

Previous page    1 → 50 / 150    Next page →

| Member | Since | Region | Email | Profile |
|---|---|---|---|---|
| Mike-Paul S | 2010 | NY | | |
| Amélie C | 2010 | PAR | | |
| Joelle L | 2010 | NY | | |
| William L | 2010 | NY | | |
| Marie-france L | 2010 | PAR | | |

MY EMAILS 2012

| | Total | Unread |
|---|---|---|
| Total number of messages | 1 | 1 |
| Number of messages received | 1 | 1 |
| Number of messages sent | 0 | 0 |
| Number of messages deleted | 0 | |

View Mailbox
View Inbox
View Outbox
View Trash

2014

*My Mailbox* 2016

[Delete]  ✓ Inbox message read  ✗ Sent message read by recipient  ✗ Sent message not read and deleted by recipient  2018

| | Date | Read | From | To | Subjet |
|---|---|---|---|---|---|
| ☐ | 2010-03-30 06:39:40 | | Marie-france Lxxxx | William Lxxxx | salut |

MEMBERS' ACTIVITIES — 2110

Ad's selection criteria — 2112

| Ad categories | Publish date | Ad date | Location | Search |

2116    1 → 25 / 142    Next page

| Ad's Title | City Region | Category | Ad Date | Submit Date | See | 2118 |
|---|---|---|---|---|---|---|
| 2011Q1 Cocktail | NY | Outings: Bars & Restaurants | Wed Mar 30, 2011 6:30 p.m. - 8:30 p.m. | 2011-03-08 | | |
| 2010 Year End Cocktail & Win a Price | NY | Outings: Bars & Restaurants | Wed Dec 22, 2010 6:30 p.m. - 8:30 p.m. | 2011-03-08 | | |
| Dim Sum to start the new Rabbit year | NY | Outings: Bars & Restaurants | Sun Feb 13, 2011 11:00 a.m. - 2:00 p.m. | 2011-01-11 | | |
| NYC Halloween Cocktail & Win Prize | NY | Outings: Bars & Restaurants | Wed Oct 27, 2010 6:30 p.m. - 8:30 p.m. | 2010-10-20 | | |
| Cocktail NYC 2010Q3 | NY | Outings: Bars & Restaurants | Wed Sep 29, 2010 6:30 p.m. - 11:00 p.m. | 2010-09-05 | | |
| Cocktail NYC 2010Q2 | NY | Outings: Bars & Restaurants | Wed Jun 30, 2010 6:30 p.m. - 11:00 p.m. | 2010-06-23 | | |
| Cocktail NYC 2010Q1 | NY | Outings: Bars & Restaurants | Wed Mar 24, 2010 6:30 p.m. - 11:45 p.m. | 2010-02-07 | | |
| Sailing to Patagonia | NY | Sporting & outdoors activities | Jul 10, 2009 - Oct 1, 2009 | 2009-07-10 | | |
| Cocktail à New York 2009Q3 | NY | Outings: Bars & Restaurants | Wed Sep 30, 2009 6:30 p.m. - 9:00 p.m. | 2009-07-03 | | |
| Cocktail à New York 2009Q2 | NY | Outings: Bars & Restaurants | Wed Jun 17, 2009 6:30 p.m. - 11:00 p.m. | 2009-05-01 | | 2120 |
| Opening Reception Photography | NY | Outings: Art (Museums, Exhibitions,..) | Apr 21-30 2009 | 2009-04-06 | | |
| FRENCH MOVIES | NY | Outings: Movies | Apr - Jun 2009 | 2009-04-05 | | |

Figure 22:

MY EXTERNAL INVITATIONS 2212 — 2210

Previous page    1 → 4 / 4  2216    Next page

Invite a new member 2214

| Invitation date | First name | Last name | Email | Resend the invite | Add to my contacts | Delete the invite | 2218 |
|---|---|---|---|---|---|---|---|
| 2011-03-14 | John | Doe | jojo@john.com | ✉ | ? | X | |
| 2011-03-14 | John | Doe | john@doefamily.org | | 👥 | | |
| 2011-03-14 | Paul | Smith | paul.smith@smith.com | ✉ | | X | 2220 |

SYSTEM AND METHOD FOR MANAGING RELATIONSHIPS WITH INDEPENDENT MULTI-DIMENSIONAL GROUPING, INDIVIDUALIZED PRIVILEGES, AND INTERACTIVE FEEDBACK IN A SOCIAL NETWORK

CROSS REFERENCE TO RELATED APPLICATIONS

This application claims the benefit of U.S. Provisional Application No. 61/325,635 filed on Apr. 19, 2010, the entire contents of which is incorporated herein by reference thereto.

BACKGROUND OF THE INVENTION

1. Field of the Invention

The invention relates to a system and method for managing relationships with independent multi-dimensional grouping, individualized privileges and interactive feedback in a social network.

2. The Prior Art

A social network consists of individual and their relationships to other individuals. Individuals can have direct relationships with other individuals when they have established a formal direct connection. Individuals can also share an indirect relationship by virtue of sharing a common relationship with other individuals with whom they have a direct relationship or by virtue of sharing membership to a same group. When the number of users in a social network increases, the complexity of the social network and of identifying and tracking all relationships can grow exponentially.

In the past, prior to the internet, the telephone and mail were the main forms of communications. These previous forms of communications were slow and/or expensive, limiting the frequency of their use. In a mobile society where people could move across states, regions or even national boundaries, people could only keep a handful of connections when they moved forward in their lives and readily relocated. The internet has revolutionized social networking in two primary ways. First, it enables people to maintain old relationship with previous acquaintances, friends, and family. Second, it facilitates the development of new relations by reaching to people who would have been unreachable with previous forms of communications because of financial constraints or geographical limitations. The internet has allowed not only to expand their network exponentially but also to connect at quasi-instantaneous speeds at no cost unlike anything possible with other forms of communications.

Since the internet, many individuals use software solutions to store and manage their relationships with other individuals. Not surprisingly, the emergence of social networks and address book computerized solutions has led to a proliferation of newer and improved designs to tackle the ever-growing complexity of larger networks.

However, the social networking solutions that have been proposed have been imperfect in enabling users to manage these expanded and fast moving networks. In particular users have been proposed limited options to manage their information sharing, connections sharing, and levels of 'intimacy'. Most notably, conventional networking solutions have been imperfect in empowering the users to share their information in ways they see best fit and to manage their connections according to their perceived or real levels of intimacy.

For instance, a user member of a social network may share various connections with different members at different degrees of intimacy. In particular a member may have a different level of intimacy with a family member, a classmate, a fellow commuter, a close friend, or a coworker. Accordingly, at the primary level a member user may want to group and organize his connections according to his/her perceived level of intimacy. On a secondary level, a user member may want to share his connections according to specific levels of preferences.

SUMMARY OF THE INVENTION

It is therefore an object of an embodiment of the present invention to provide a system & method for managing relationships in a social network It is another object according to an embodiment to provide independent multi-dimensional groupings.

It is a further object according to an embodiment to provide individualized privileges & interactive feedback.

It is yet another object to provide a privilege levels at a degree of granularity such that individual items of information can have independent privilege levels assigned to them.

It is a further object to have the privilege levels selectable from a sliding scale of at least three levels and preferably more than 5 levels.

These and other related objects are achieved by a system and method for managing relationships with independent multi-dimensional interactive feedback in a social network according to the invention.

In a first embodiment of the invention, there is provided a system for managing the sharing of contributed information among a plurality of users of an online social relationship network. The system includes a server, a database and a set of instructions. The server for receives information from a contributing member and for providing information to a requesting user. The database is operatively coupled to said server for storing items of information about the contributing member. The set of instructions is stored in an electronic storage medium for programming the server to (i) allow the contributing member to assign a different privilege level for each item of information on a first sliding scale having at least three levels and (ii) allow the contributing member to grant a privilege level to a requesting user on a corresponding second sliding scale having at least three levels. Upon an information request from the requesting user, the server retrieves all items of information about the contributing member and selectively displays those items of information which have been assigned a privilege level matching or less than the privilege level granted to the requesting member.

The system further includes a private computer network, wherein the server, the database and the set of instructions are maintained on the private computer network. The system further comprises a public computer network and a plurality of contributing members and requesting users, wherein the contributing members and the requesting users access the private computer network via the public computer network.

The database further includes a record having fields and field titles for each contributing member, wherein each item of information is stored in a field of the record, wherein upon an information request from the requesting user, all fields titles are displayed and the fields are selectively populated based on the assigned privilege level being equal or less than the granted privilege level.

A contributing member grants a privilege level to a requesting user by one of the following methods. First (a) the contributing member accepts the requesting user as a friend and grants a direct privilege level, wherein the requesting user is able to selectively see the contributing member's items of information based on the assigned privilege level being equal or less than the granted direct privilege level. Second (b) the contributing member can choose to inherit the privilege levels granted by her/his contacts to all friends of such contacts, wherein friends of the requesting user inherit the lowest privilege level in the chain from contributing member to requesting user to one or more friends, wherein the friends of the requesting user are able to selectively see the contributing member's items of information based on the assigned privilege level being equal or less than the granted indirect privilege level being equal to the lesser of the direct level privilege level assigned to the friend by the contributing member and the privilege level assigned by the friend to his/her friends'. Third (c) the contributing member joins a network and grants an group network privilege level to a network comprised of "friends of friends", wherein all members of the network are able to see the contributing members identity and all members of the network are able to selectively see the contributing member's items of information based on the assigned privilege level being equal or greater than the lesser of their default privilege level or the group privilege level assigned to them by the contributing member.

One of the networks comprises a group of separate unconnected individuals. The requesting user (I) is assigned a privilege level (L) by a particular contributing member. Each item of information of the contributing member has a privilege level $C_1, C_2, C_3, \ldots C_N$, wherein the requesting user has a privilege index comprised by comparing the user's assigned privilege lever with respect to that member ($T_L$) with each privilege level $C_1, C_2, C_3, \ldots, C_N$. This creates a level of granularity comprising an individual privilege comparison for each item of information defined generally as $T_L$ vs. $C_N$.

The system further includes a grod comprising a group communication or group board, wherein a member can create a grod and attach it to a group or network. The system further includes recommending members, recommended members, rating members and rated members. A recommendation provided by a recommending member about a recommended member is public along with the identity of the recommending member. A rating provided by a rating member about a rated member is private, with three or more ratings being compiled and displayed to the rated member as an average of the compiled ratings.

The system further includes a central profile database and several private computer networks, wherein several social networks exist on the several private computer networks. A contributing member has their contributed information on the central profile database which can be linked to the several social networks without having the re-enter their contributed information.

The system further includes a page view comprising contacts by networks and displaying all networks to which the contributing member belongs to, wherein each displayed network includes a corresponding link which maps a network listing to a listing of members within the network, wherein the link connects the contributing member to a listing of all members in the corresponding network.

A second embodiment of the invention comprises a method for managing the sharing of contributed information among a plurality of users of an online social relationship network including the steps of providing, coupling, executing and conditionally retrieving. In the first step, the method comprises providing a server for receiving information from a contributing member and for providing information to a requesting user. The next step comprises operatively coupling a database operatively to the server for storing items of information about the contributing member. The third step comprises executing a set of instructions stored in an electronic storage medium for programming the server to (i) allow the contributing member to assign a different privilege level for each item of information on a first sliding scale having at least three levels and (ii) allow the contributing member to grant a privilege level to a requesting user on a corresponding second sliding scale having at least three levels. The fourth step comprises, responsive to an information request from the requesting user, retrieving, all items of information from the server about the contributing member and selectively displaying those items of information which have been assigned a privilege level matching or less than the privilege level granted to the requesting member.

The method further comprises providing a private computer network, wherein the server, the database and the set of instructions are maintained on the private computer network; and further comprising a public computer network and a plurality of contributing members and requesting users. The contributing members and the requesting users access the private computer network via the public computer network.

The method further includes a database having a record with fields and field titles for each contributing member, wherein each item of information is stored in a field of the record. The method further includes the step of responsive to an information request from the requesting user, displaying all fields titles and selectively populating the fields based on the assigned privilege level being equal or less than the granted privilege level.

The contributing member grants a privilege level to a requesting user by one of the following steps. First (a) accepting the requesting user as a 'friend' and granting a direct privilege level, wherein the requesting user is able to selectively see the contributing member's items of information based on the assigned privilege level being equal or less than the granted direct privilege level. Second (b) inheriting the privilege levels granted by her/his contacts to all friends of such contacts, wherein friends of the requesting user inherit the lowest privilege level in the chain from contributing member to requesting user to one or more friends, wherein the friends of the requesting user are able to selectively see the contributing member's items of information based on the assigned privilege level being equal or less than the granted indirect privilege level. Third (c) joining a network and granting an indirect network privilege level to a network comprised of "friends of friends", wherein all members of the network are able to see the contributing members identity and all members of the network are able to selectively see the contributing member's items of information based on the assigned privilege level being equal or greater than the lesser of their default privilege level or the privilege level assigned to them by the contributing member.

One of the networks comprises a group of separate unconnected individuals. The method further comprises assigning the requesting user (T) a privilege level (L) by a particular contributing member, wherein each item of information of the contributing member has a privilege level $C_1, C_2, C_3, \ldots C_N$. The requesting user has a privilege index comprised by comparing the user's assigned privilege lever with respect to that member ($T_L$) with each privilege level $C_1, C_2, C_3, \ldots C_N$, to create a level of granularity comprising an individual privilege comparison for each item of information defined generally as $T_L$ vs. $C_N$.

A further step includes providing a grod comprising a group communication or group board, wherein a member can create a grod and attach it to a group or network. The method includes providing recommending members, recommended members, rating members and rated members; wherein a recommendation provided by a recommending member about a recommended member is public along with the identity of the recommending member. Wherein a rating provided by a rating member about a rated member is private, with three or more ratings being compiled and displayed to the rated member as an average of the compiled ratings.

The method further includes the step of providing a central profile database and several private computer networks, wherein several social networks exist on the several private computer networks. A contributing member has their contributed information on the central profile database which can be linked to the several social networks without having the re-enter their contributed information.

The method further includes the step of providing a page view comprising contacts by networks and displaying all networks to which the contributing member belongs to. Each displayed network includes a corresponding link which maps a network listing to a listing of members within the network. The link connects the contributing member to a listing of all members in the corresponding network.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views:

FIG. 9 is a page view showing contacts by groups.

FIG. 10 is a further page view showing contacts by members.

FIG. 11 is another page view showing direct affiliations.

FIG. 12 is a further page view conveying profile information at different privilege levels.

FIG. 13 is another page view showing privacy settings for individual fields.

FIG. 14 is an additional page view showing profile statistics.

FIG. 16 is another page view illustrating the rating process.

FIG. 17 is an additional page view showing the recommendations process.

FIG. 19 is another page view showing a new member listing.

FIG. 20 is a further page view showing a listing of a member's emails.

FIG. 21 is an additional page view showing Members Activities.

FIG. 22 is another page view showing External Invitations.

DETAILED DESCRIPTION OF THE PREFERRED EMBODIMENT

Figure 1:
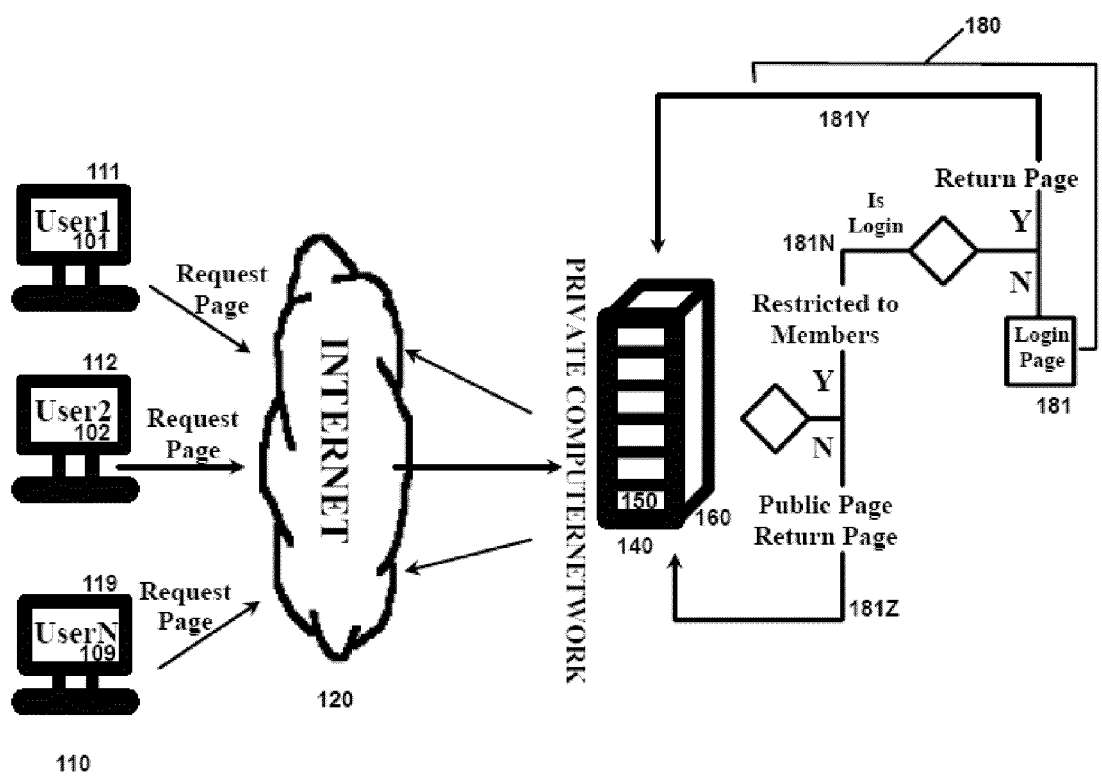
FIG. 1 is a schematic overview of the connection between users and a private computer network according to an embodiment of the invention.

Referring now in detail to the drawings the basic building blocks of the invention will be described in connection with an embodiment of the invention. Users will connect through a public computer network to the private computer network which contains software, programs, databases and accounts comprising the system of the invention.

A Public computer network is more generally referred as the "Internet". The internet is a communication network connecting millions of private computer networks. The communications points are generally called nodes, ports or connections points and can consist of routers, switches, and modems. At any point in time, each private computer network's connection is uniquely identified on the public computer network by an Internet Protocol (IP) address, akin to a telephone number on the traditional telephone system.

A private computer network may be comprised of the following hardware equipments: personal computer stations, server processors, data storage mediums, firewalls, routers, and switches. The exact configuration of a private computer system is not fixed in time but may evolve with technological advances and breakthroughs. The private computer network is connected to the public computer network or internet. The computer stations and server processors may execute software instructions and programs including: (a) an operating system such as but not limited to the Windows developed by Microsoft corporation or the Linux operating system, the open source operating system, (b) an internet server such as but not limited to Apache, an open source software, (c) an email server and (d) various other software utilities for the proper functioning and performance optimization of the private computer network.

The invention consists of a software solution residing on a web server in a private computer network connected to the interact. The software requires a central processing unit which performs calculations and logic operations required to execute the program.

A database is where information and content is stored on a private computer network. A database may be managed by database management software such as but not limited to MySQL, Mircrosoft SQL, or Oracle.

The website software is the interface between the users and the private computer network and manages the interactions between the users and the private computer network.

The user account controls access and entry into the system. To create a user's account, a user needs to create a user-name, choose a password and agree to the terms of use. The user's profile is the online version of a user's resume/CV. The user's profile is stored in the private computer network in a data storage system. The user's profile contains various information submitted by the user including but not limited to personal information, professional information, education, hobbies and interests.

While the concept of a contact directory or address book is not novel, the solution herein allows a user member to organize and group his/her connections according to his affiliation level in as many groups as he/she wishes. Networks and groups can overlap or be completely separate. In mathematical terms, a user-member can belong to the intersect of many groups to reflect the complexity of social connections. Indeed in real life situation my brother (member of the family group) can also be my neighbor (neighbor group) and a member of the local football team's fan's club to which I also belong.

Since the dawn of civilization, social groups have adopted ranks and titles as an embodiment of the many different privileges and responsibilities of each individual or groups of individuals. Ranks and titles establish a formal or informal hierarchy for access to information, decision making, rights, privileges and responsibilities. In the military in particular, ranks and different levels of accreditations are pervasive in the software industry, in particular for financial software solutions, it has long been established that different users have different user rights. There are different input and access user rights (back office, front office, management) for trade entry, trade modifications, trade confirmation, access to summary reports and risk management, etc.

The concept of inheritance is standard and widely used in object oriented programming languages such as C#, C++, Java, Visual Basic. As the name suggests when inheritance occurs, a child object inherits the properties and methods of its parent object. In this method, the concept of inheritance is widely used to let users enable the system to suggest new contact connections for their contacts' contacts.

The system is further comprised of user generated content including but not limited to email messages, group messages, forum contributions, various notices, ads and posts. Such user generated content is stored in the system to be rendered to other users The invention claims to combine the basic building blocks listed above in a novel and unique configuration to provide users with a more realistic network management platform as explained below.

Referring now to FIG. 1, there is shown the computer network and system according to the invention along with the access/request method. The method and solution are embodied and reside in a private computer network 140 connected to a public computer network 120 more commonly referred to as the Internet. The software 150 runs on a host server 160 within the private computer network. Users 101, 102, . . . 109 may access the host sever 160 by connecting to the private computer network 140 via the internet 120. The users generally are referred to as reference numeral 100.

Typically the user 102 will use a web browser on his computer workstation 112 to establish a connection. To access the system database, the user will initiate a login session to obtain access. If the user does not have an existing account on the system, the system will prompt him/her to fill out a subscribe form. The login process 180 presents the user with a login page 181. An existing member will be able to login directly, and follow the "Y" route 181Y into the members area of the database. Otherwise, the use will be directed along the "N" route 181N, to a decision block which restricts access to members. If the user is not yet a member, they will be directed along the "Z" route 181Z where the host server 160 will return only public pages.

Figure 2:
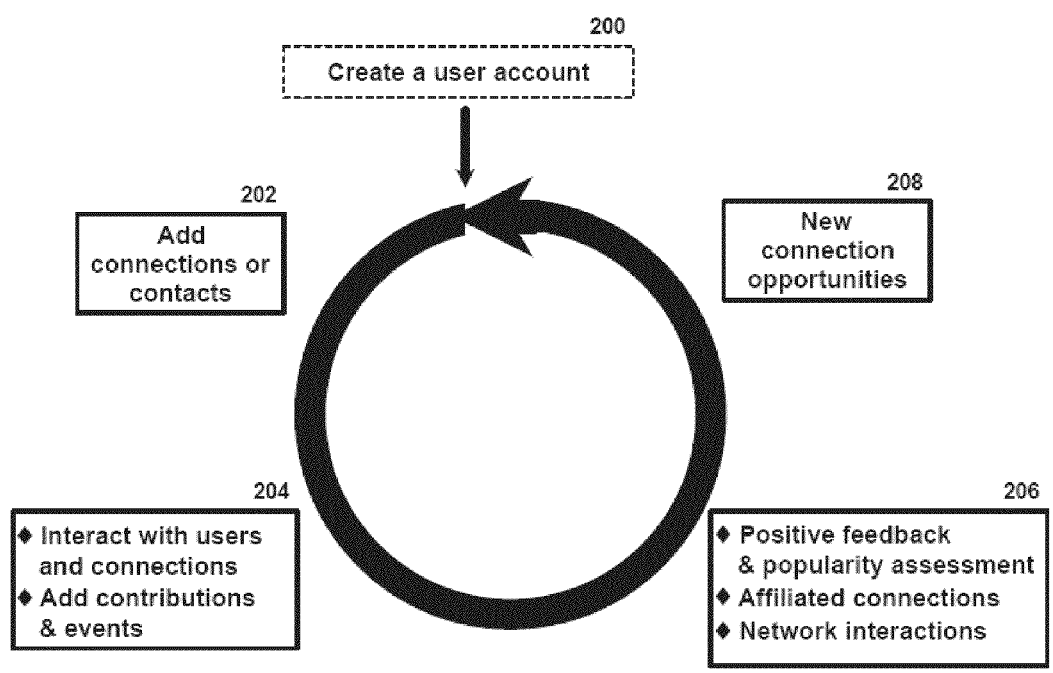
FIG. 2 is a diagram illustrating various steps from creating anew user account to managing and expanding one's networks and connections.

FIG. 2 illustrates the Social Network Wheel, beginning at the 12 o'clock position, where a user is presented with the opportunity to Create a new user account 200. Individuals without a user account can create one by filling out an online subscribe form. The subscribe form prompts them in particular to submit their personal and professional information. The user must also choose a password for future access to his/her account. The computer system gathers descriptive data from the users and collects activity data occurring on the system. The descriptive data and activity data will be cross-referenced to allow the use to Add Connections or contacts 202. The system gathers four types of data, namely Descriptive Data, Activity Data, Relationship Data and Evaluation Data. A brief description of each type of data follows.

Descriptive data generally describes the characteristics of a user. Once logged-in, users can update their account profile and submit any type of additional information of personal, professional or other nature.

Activity data relates to data about that users generate though their active participation and social interaction on the platform. User can submit data by using standard communication toots such as the internal email system, the message board, the forums, the ads submission system, and the events organizer. The submission of such data allows the user to Interact with other users and connections 204.

Relationship data describe the links between the members in the network. Users may constantly update their contacts or groups. (a) They may modify their privileges policies and the controls for access to their information. They can update at any time other users' rights concerning their account information. All the different and specific layers of confidentiality are user-defined and personalizeable. (b) Users can also constantly update their grouping preferences. Unlike other conventional website, the present invention allows each Individual to be grouped in varieties of different ways to reflect the complexity of social interactions. The platform gives the ability to the users to contemplate the true nature of their relationship with other individuals. This multi-dimensional grouping allows for truly complex and intricate interactions among a user's contacts.

Evaluation data describe the quality of a relationship with the network. Users on the platform further have the ability to provide ratings, recommendations or blames about one another. This system enables the users of the platform to provide feedback on any individual in the network. Block 206 represents the Feedback and Assessment feature. When users are looking for a New Connection Opportunity 208, e.g. a contact for personal, business or more intimate relationships, users are less adverse to the risks of rejection or deception.

Figure 3:
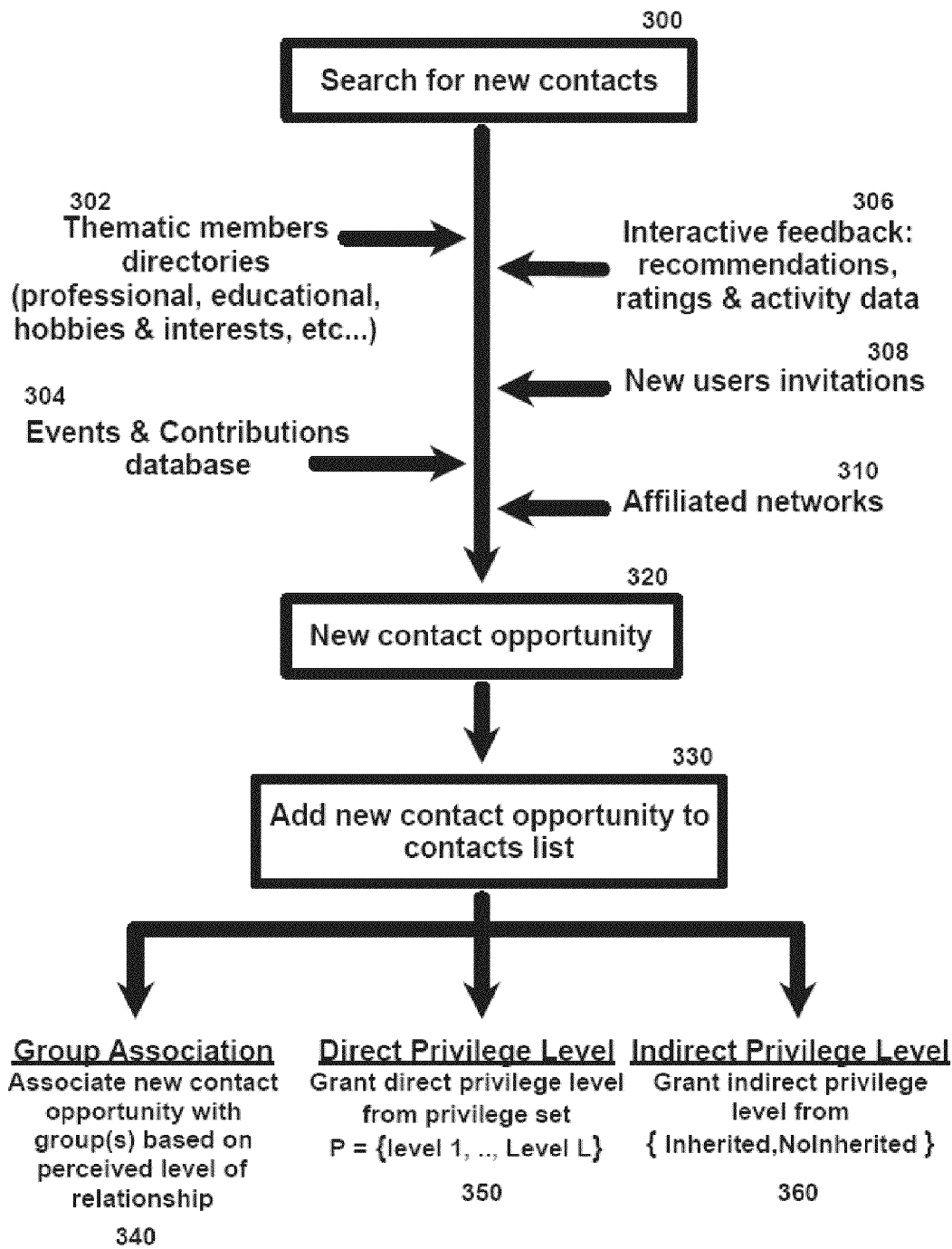
FIG. 3 is a diagram illustrating certain steps in searching for new contacts.

As can be seen in FIG. 3, there are multiple ways to Add New Contacts, Give/Receive Interactive Feedback and Enable Privilege Settings. A user begins in the top box, Search for new contacts 300. Shown below the top box are five exemplary areas in which the user can locate new contacts. In box 302, a user checks Thematic Members Directories (professional, educational, hobbies & interests, etc.). In box 304, the user checks the Events & Contributions Database. In box 306, the user checks Interactive Feedback: Recommendations, Ratings & Activity Data. In box 308, the user review New User's invitations. In box 310, the user checks Affiliated Networks. Next, the user identities a New Contact Opportunity 320. The user can Add the New Contact Opportunity to Contacts List 330. In executing the Add function 330, the user can choose from three exemplary options. First the user may select a Group Association 340, in which they Associate the New Contact opportunity with group(s) based on the perceived level of relationship. Second the user may select a Direct Privilege Level 350, in which the user Grants a Direct Privilege Level from a Privilege Set, where P={level 1, . . . , level L}. Third the user may select an indirect Privilege Level 360, in which the user Grants to his/her contact's contacts an Indirect Privilege Level from {inherited or non-inherited}.

The Granting of Direct or indirect Privilege Levels is further described in connection with FIG. 4, in a Network Management schematic. The user 401 has a collection of User Networks 410, for example, Network(1) 410*a*, Network(2) 410*h* and Network(N) 410*n*. Within each Network, the user has a various contacts 420. Contact (1) 420*a* is a member of both Network(1) 410*a* and Network(2) 410*b*, Contact 420*q* is a member of Network(N) 410*n*. When user 401 adds Contact (1) 420*a* to its Network(1) 410*a*, they grant that contact's an Indirect Privilege from Set 460 and a Direct Privilege from Set 450.

Figure 5:
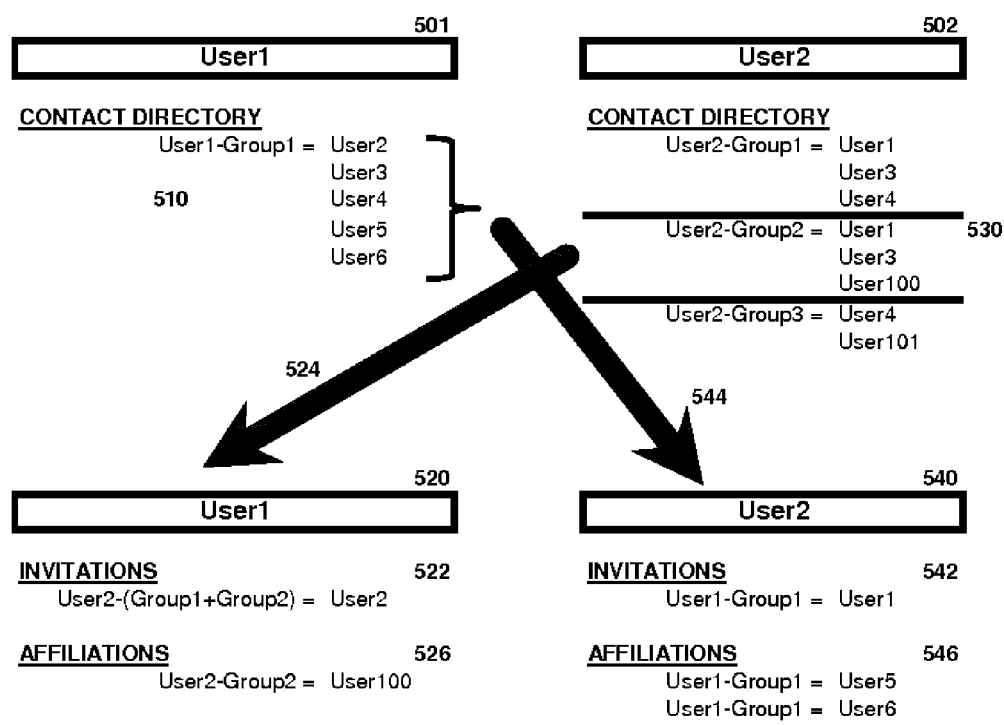
FIG. 5 is a diagram illustrating a group management method.

FIG. 5 illustrates a first Group Management Method. User (1) 501 has a Contact Directory 510 consisting of a Group listing where Users 2, 3, 4, 5 and 6 are members of that Group(1). Under the Group Management Option 520, User (1) has sent an Invitation 522 to User (2). Note that the invitation has accessed link 524 to indicate that User(1) is already connected to User(2) through common association in Group(1) and Group(2). Through the Affiliations 526, User (1) may be placed into contact with other users in common groups, for example, User(100) who is also a member of Group(2). User(2) 502 has a Contact Directory 530 consisting of a Group listing where: Users 1, 3 and 4 are members of Group(1); Users 1, 3 and 100 are members of Group(2); and Users 4 and 101 are members of Group(3). Under the Group Management Option 540, User(2) has sent an Invitation 542 to User (1). Note that the invitation has accessed link 544 to establish Affiliations 546. Through these Affiliations 546, User(2) may be placed into contact with other users in common groups, for example, User(5) and User(6) who are also members of Group(1).

Figure 6:
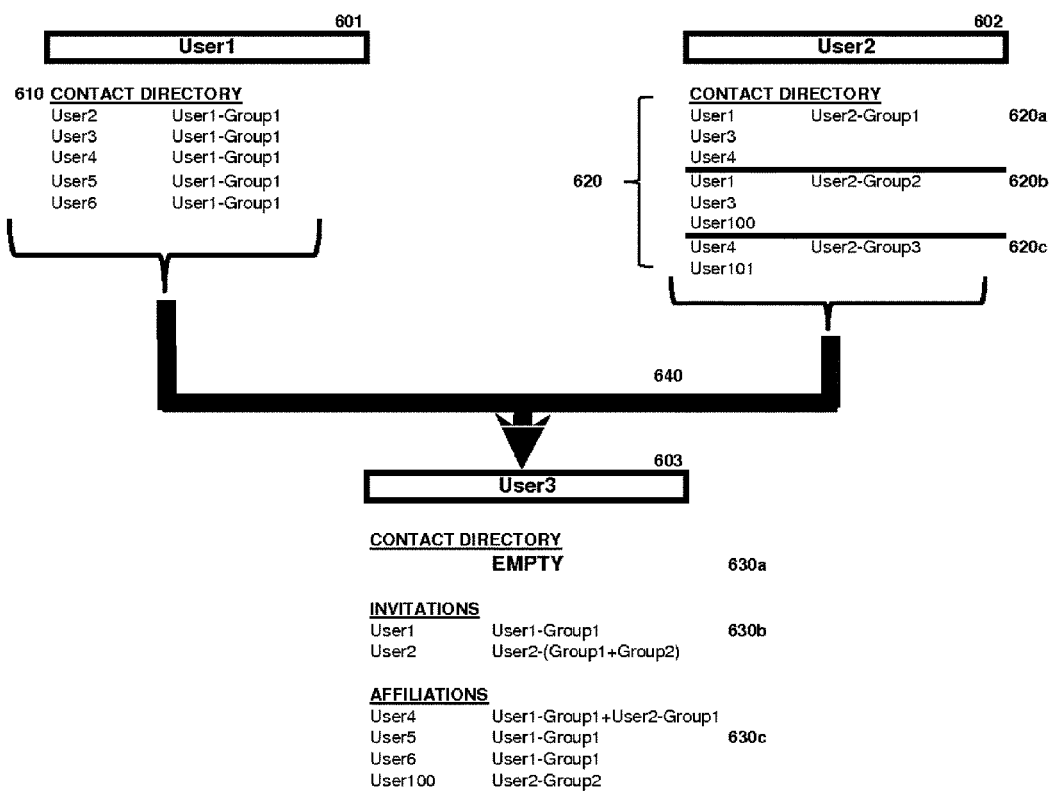
FIG. 6 is a diagram illustrating an different group management method.

FIG. 6 illustrates a second Group Management Method. User(1) has a Contact Directory 610 indexed by User and sub-indexed by Group. User(2) has a Contact Directory 620 indexed by User into categories 620*a*, 620*b* and 620*c*. Within each category, the Directory is sub-indexed by Group. As a new User(3), the Contact Directory 630*a* is empty. User(3) receives a first invitation 630*b* to User(1), who is a member of Group(1). User(3) receives a second invitation to User(2), who is a member of Groups(1+2). Through Link 640 with Users 1 and 2, User(3) is able to establish Affiliations 630*c* to Users 4, 5, 6 and 100, where those Affiliation Listings show the User(X)-Group(Y) that each of the Users 4, 5, 6 and 100 belong to.

Figure 7:
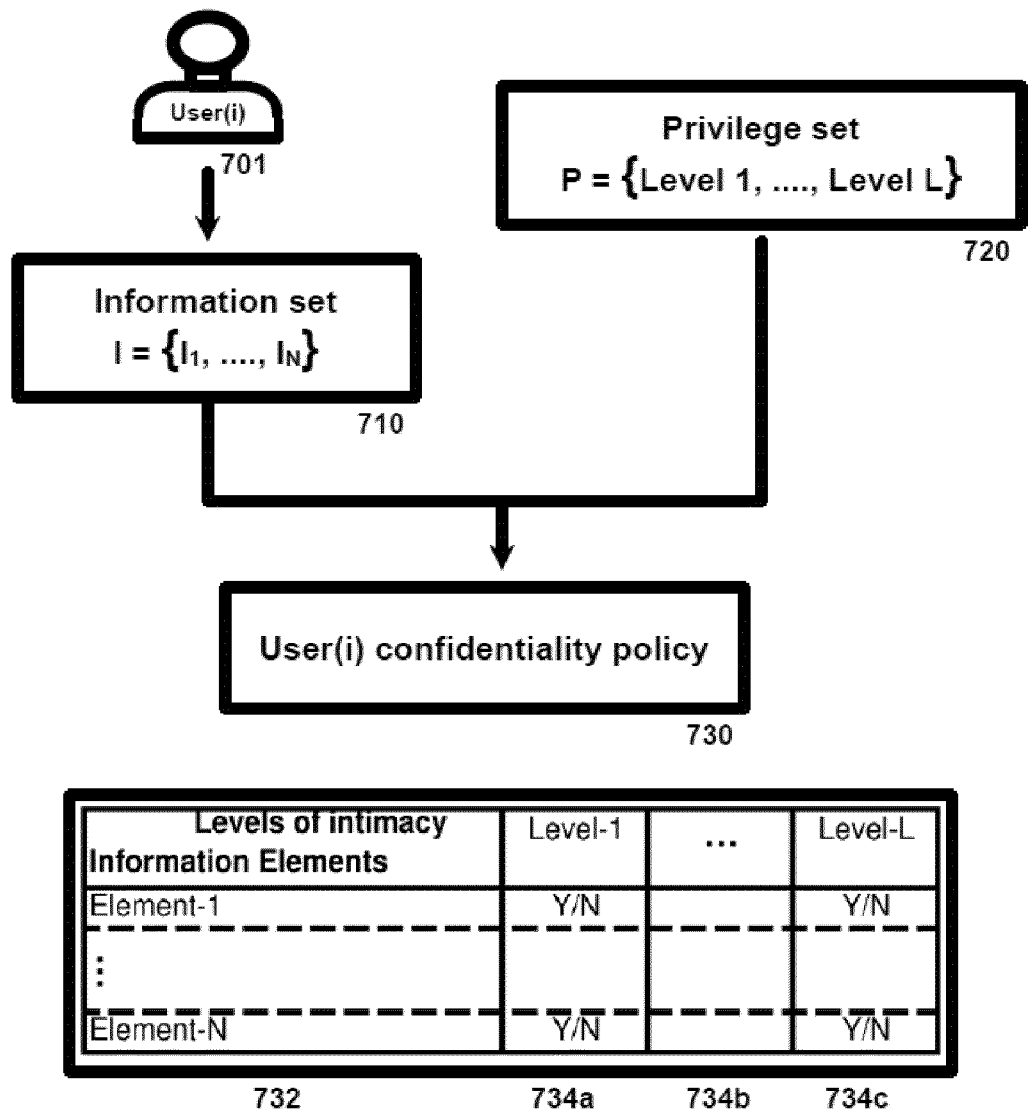
FIG. 7 is a diagram showing the components of a user confidentiality policy.

FIG. 7 shows an embodiment of how a User(i) 701 can adjust their Confidentiality Settings. The user has an Information set 710 containing element data about the user's job, family, hobbies, etc. The user further has a Privilege Set 720 where they can adjust the privilege levels for their contacts. The interaction between sets 710 and 720 is used to establish User Confidentiality Policy 730. Within the Policy 730, a first column is provided that contains the information Elements 732, itemized as Element(1) through Element(N). The remaining columns allow the user to select a Level of Intimacy. For Level(1) contacts shown in column 2 734*a*, the User can select access control to Yes or No for all Level(1) contacts, Similarly, the next column 734*b* allows the user to select access control for all Level(2) contacts. Note that item 350 in FIG. 3 and items 450 and 460 in FIG. 4 show instances where a User is granting a privilege level for new contacts. Once a Level(1) privilege is granted in item 350 to a new contact, that new contact will have access to all information elements of column 732, where positive access has been indicated in the corresponding column 734*a*.

Figure 8:
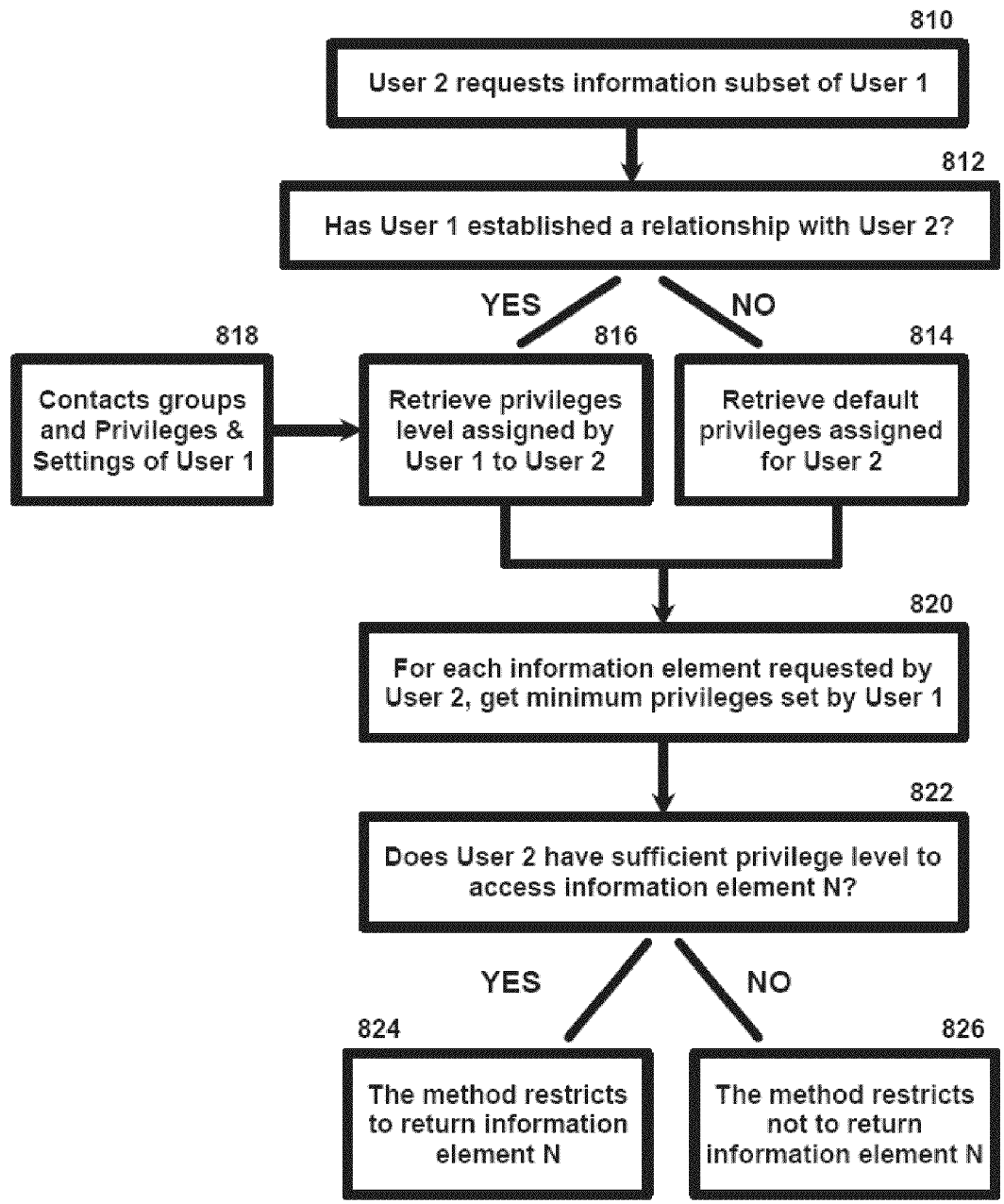
FIG. 8 is a flowchart illustrating an information request.

FIG. 8 is a flowchart illustrating Information Request, Privileges and Confidentiality Settings. The user may also request access to information about other users or access other users' contributed information. In step 810, User(2) requests information subset of User(1). A privilege or user-right system enables users to define and specify how they would like their personal and contributed information to be distributed across their networks and user groups in step 812, the system queries, whether User(1) has established a relationship with User(2). In step 814, the query answer is NO, and the system Retrieves the Default Privileges Assigned for User(2). In step 816, the query answer is YES, and the system Retrieves Privilege Levels Assigned by User(1) to user(2). Under these circumstances, the system will import the Contact Groups and Privileges & Settings of User(1) 818.

Under either option, the process continues to step 820 where, For Each User, the information element requested by User(2), to get the minimum privileges set by User(1). Then for each information individual request, in step 822, the system queries, Does User(2) have sufficient privilege level to access the information element N? if Yes, then in step 824, the method allows the return of information element N. If No, then in step 826, the method restricts the return of information element N.

In this example, User(2) is the Requestor and User(1) is the Requestee. The system retrieves the privilege level of the Requestor granted by the Requestee and determines the scope of the data to return. The platform does not attempt to second-guess users' permissions but exclusively rely on users' confidentiality settings.

In an embodiment, a method of controlling access to users' submitted and contributed content based on privilege indices. Specifically, the method combines a complex one-to-one mapping between individual information elements and a privilege index for each individual user. For example, this mapping determines whether a user T with privilege level L can access information with confidentiality level C.

As a corollary to the Group Management Method of FIG. 5, there is shown a Contact listing by Groups shown in FIG. 9. The page view 910 shows a heading "MY CONTACTS (BY GROUPS) 912 to inform the user as the category in which the following information is being presented. The title 914 reads "Members I have invited into my networks". There is a table 916, with a table summary 918 that reads "I have invited a total of 5 members in 2 networks. The table header 920 shows 5 column headings, namely, My Networks, My Contacts, Creation (date), Last Update (date) and View, Row 922 shows the first network "Ifc TESTEURS" in column 1, 5 contacts in col. 2, a creation date of "Mar. 27, 2010" in col, 3, a last update of "Mar. 29, 2010" in col. 4 and a link in col. 5 to open the view shown in FIG. 10. The next row 924 shows analogous data for the group "Family,"

The system also provides for users to maintain Singleton groups. Sometimes, a contact does not fit into any user's existing network. But the user wants to add the contact into his/her contact list. In such a situation, the method proposes a Singleton group? A contact belonging to the singleton group, does not share any connection with the other contacts in this group. As the name Singleton suggests, any contact in this group has a unique and separate relationship with the group owner.

FIG. 10 shows the more detailed page view 1010 under the heading 1012 of "MY CONTACTS (BY MEMBERS). The title 1014 reads the same as title 914. A key 1016 shows two symbols used in the table to denote which members have accepted or not accepted invitations. There is a table 1020, with a table summary 1018 that reads the same as table summary 918. The table header 1022 shows 7 column headings, namely, MyContacts, My Networks, Privileges granted to my contacts, privileges granted to affiliated members, Send an email link, See profile link, and invite status. Next, five rows 1024, 1026, 1028, 1030, and 1032 are provided, with one row for each of the members. In column 3, the table indicates the direct privilege level, for example, the level set in 350 or 450. In column 4, the table indicates the indirect privileges, for example, the level set in 360 or 460.

FIG. 11 shows Direct Affiliations, in a page view 1110 with a heading "MY DIRECT AFFILIATIONS" 1112. The title 1114 reads "The networks I have been invited into by other members". This page view is a corollary to FIG. 9, which shows "Members have invited into my networks," A key 1116 shows invite status, namely, whether the user has accepted or not accepted the invitation. More particularly, Key 1116 indicates a check mark for 1) My Contacts: Indicates members who have invited me into their networks and whom I have accepted their invitations and an "X" for 2) Inviting Members: Members who have invited me into their networks but whom I haven't accepted their invitations.

The table 1120 includes a table summary 1118 indicating invitations received, namely 2 invitations into 3 networks. The table header 1122 shows 7 headings, namely, Member's name, Network's name, Privilege received, Privilege granted, Send an email link, View Profile link and Network Status. Rows 1124 and 1126 are presented for each of the inviting members. When another member sends an invitation to another who doesn't accept the invitation, then the invitor receives the default privilege (the default privilege granted is Low in this particular table) denoted by the superscript '(d)'.

The system allows the users to easily Access activity data. The user may also retrieve feedback data and statistics about activities regarding his account and information. For example, the user can be informed of the other members who are requesting his/her personal information and determine if he would like to follow up with those members. A user can use his/her activity data to identify new potential contacts based on their interests and behavior on the system.

The system allows users to easily Invite new users. The invitation system allows users to invite any external individual to join the platform. Invitations are sent by email. An interface, shown in FIG. 22 keeps track of the sent invitations and allows the users to resend invitations in case of art absence of reply from the invitee. More specifically, a Page view 2210 is shown having a title 2212 My External Inviations. A link 2214, labeled allows the user to invite a New Member, by mailing them or using other suitable communications. An invitation table 2216 includes a header 2218 with seven columns, namely, Invitation Date, First Name, Last Name, Email, Resend the invite, Add to my contacts and Delete the invite. The rows 2220 show the name, date and email address to which an invitation has been sent. A link is provided to automatically resend the invitation. Accepted invitations have the resend link removed and replaced with in indication (check mark) in column 6 that the invitee has been added as a contact. The last column allows the user to delete the invite.

The invited individual may accept the invitation and then become a user of the platform. At his or her turn for the invited individual to start managing and increase the socials networks on the platform with setting up own layers of confidentiality access. When a user invites another, the invitor typically grants the invitee a higher privilege level than the system default level which should motivate the invitee to reciprocate the invitation.

The present invention relates to a computer-base system for allowing users to organize their social networks into sophisticated groups and to manager permission access with different degrees of confidentiality. On a daily basis, people make constant connections with other people. Some of these connections are recurrent or totally new or evolving. In today's fast paced environment, managing all those connections efficiently is a challenge. Obtaining, nurturing social interactions is time intensive and requires substantive effort. The challenge behind all social networking solutions is to allow people to leverage their contacts to manage and expand their networks while preserving their information from unwanted preying eyes on the same platform. The enhanced efficiency of a computerized database driven solution must be balanced by a robust permission system to preserve users' confidentiality and privacy information. Multi-dimensional grouping allows the users to strictly segregate their different contacts according to their perceived level of connection and degree of intimacy or closeness.

The user's profile is the online version of a user's resume/CV. The user's profile is stored in the private computer network in a data storage system. The user's profile contains various information submitted by the user including but not limited to personal information, professional information, education, hobbies and interests. FIG. 12 illustrates a page view 1210 with the title 1212 "MY PUBLISHED PROFILE." The table 1214 contains a header 1216 with three headings, namely, Privilege level, Members types and a View my profile link. In this example, the user has selected 6 privilege levels, each level corresponding to one of the six rows 1218-1228.

For each level, the user can independently determine what information elements will be accessible by other users assigned to that level. The level of granularity can be seen in the page view 1310 of FIG. 13, with the title 1312 "PRIVACY & PRIVILEGE SETTINGS." The table 1314 has a header 1316 with one column corresponding to each privilege level in table 1214.

In the row for Full Privileges 1228, the table 1314 shows in the last column, that members having full privileges will have the privacy setting of each row set to "No." As another example, the birth year shown in row 1318$b$, can be set to be private for each of the six columnar privilege levels. In this case, privacy is "On" for Medium and lower access levels, i.e. Low-Medium and low. The privacy is "Off" for Medium-high and higher access levels, i.e. High and Full, Any number of columns 1318$n$ can be provided based on the information elements that will be appropriate for a given social network. The last row 1320 is a category for receiving emails from other users. Accordingly, the user can determine for each information element, where the privacy cut-off wilt occur in page view 1310. The privilege levels can then be assigned to member types in page view 1210.

The method allows user to maintain strictly segregated social groups. The user can define as many groups or networks that he/she fits. A user's contacts can only establish a connection if they are a member of the same group and a contact in a group cannot share a connection with contacts in another group unless he/she is a member of both groups.

FIG. 14 illustrates a page view 1410 with Profile View Statistics. The page includes a heading 1412 "Profile Views." The first table 1414 is labeled "Members' Monthly Views" and shows views per month and a yearly total. A similar table could show views per week or per day. The second table 1416 is labeled "Views per Country" and shows views per country, total along with percent views per country. Depending on the application, this table could show views per corporate department, per state or other geographic or logical category. The table 1418 is labeled "Members' Views" and shows views by member with the date of the view.

Figure 15:
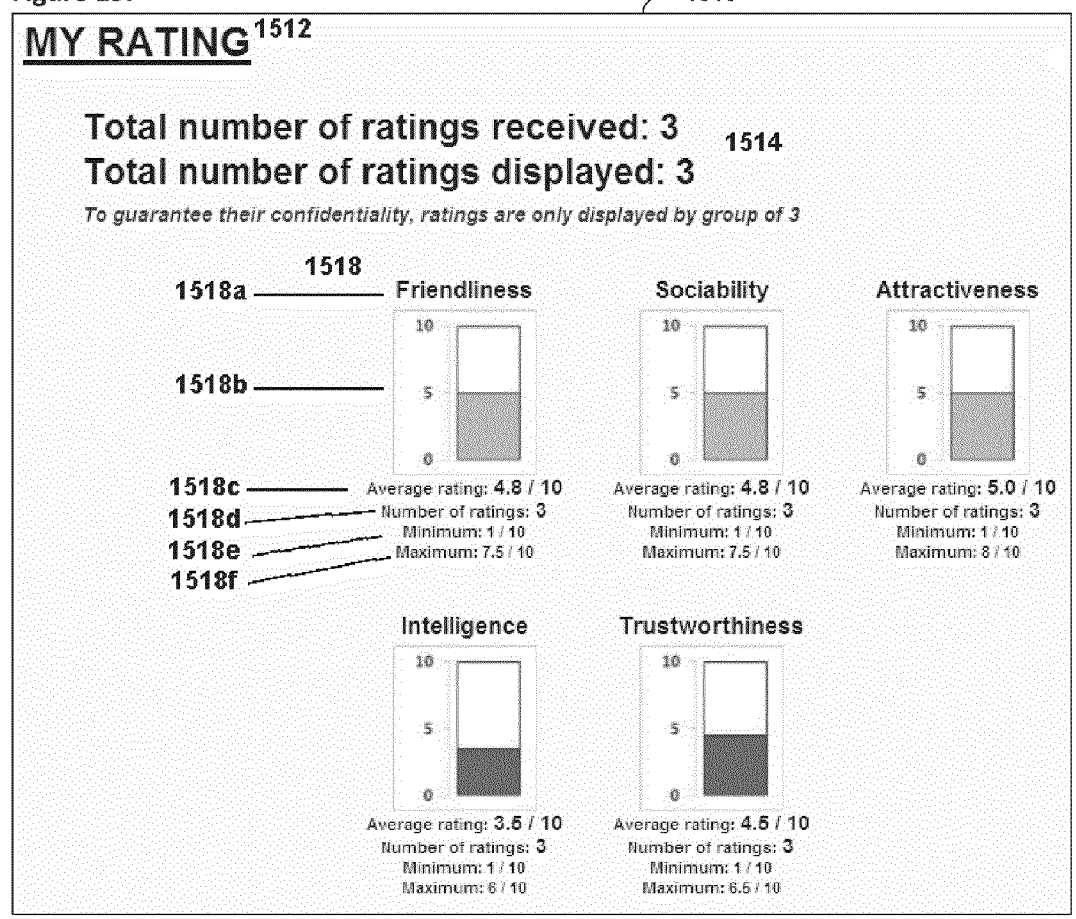
FIG. 15 is a further page view showing ratings.

Another type of feedback is more quantitative and includes a notation from 1 to 10 based on friendliness, sociability, attractiveness, intelligence and trustworthiness. The later called ratings are displayed anonymously by vote of 3. Ratings may be displayed as shown in FIG. 15, with a page view 1510 that includes a heading 1512 "My Rating." A summary 1514 of the ratings is provided. The ratings may be shown in various categories 1516, for example, Friendliness, Sociability, Attractiveness, Intelligence, and Trustworthiness. In a corporate environment, the rating categories might be Communication Skills, Completion of Projects on Time, etc.

In one category 1518 there is the title 1518a "Friendliness." A display 1518b graphically illustrates the rating level. The average legend 1518c shows the average rating (4.8) out of the total possible (10). The number legend 1518d shows the number of ratings that included in the current view. Note that the rating display will not change when a $4^{th}$ and $5^{th}$ rating are provided. Upon submission of the $6^{th}$ rating, the rating display will be updated. The minimum legend 1518e shows the lowest rating, and the maximum legend 1518f shows the highest rating.

FIG. 16 shows a page view 1610 with a title 1612 "Rate A Member." The page includes a heading 1614 indicating the name of the member being rated. The rating windows 1616 include one window for each rating category. From FIG. 15, five categories were use, and in FIG. 16 the corresponding entry windows for those five categories are presented. The values are fixed, in that the person giving the rating is limited to the 1 to 10 scale used in this example. The comment windows 1618 can be used to collect member data, like where the member met, or to provide additional information or explanations. On the lower half of the page, there is a Recommend/Blame option 1620. The member providing the recommendation may then write a short statement explaining their recommendation or blame. The statement can then be cleared or submitted via the links 1624. It should be noted that the ratings at the top half of the page are confidential, that is they are only revealed to the user in the page view 1510 in groups of three. The bottom half Recommendations/Blames are public. Thus members have a choices in how they interact with other members.

FIG. 17 shows a page view 1710 with a title 1712 "Recommendations & Blames Received." The first table 1714 shows statistics on the number of recommendations and blames and blocks received. The second table 1716 includes a header 1718 with four column headings, namely, Date, Member, RIB/V, and Recommendation/Blame. In row 1720, the various details are provided. Note the comment made in comment window 1622 is now displayed in column 4 of table 1716.

Figure 18:
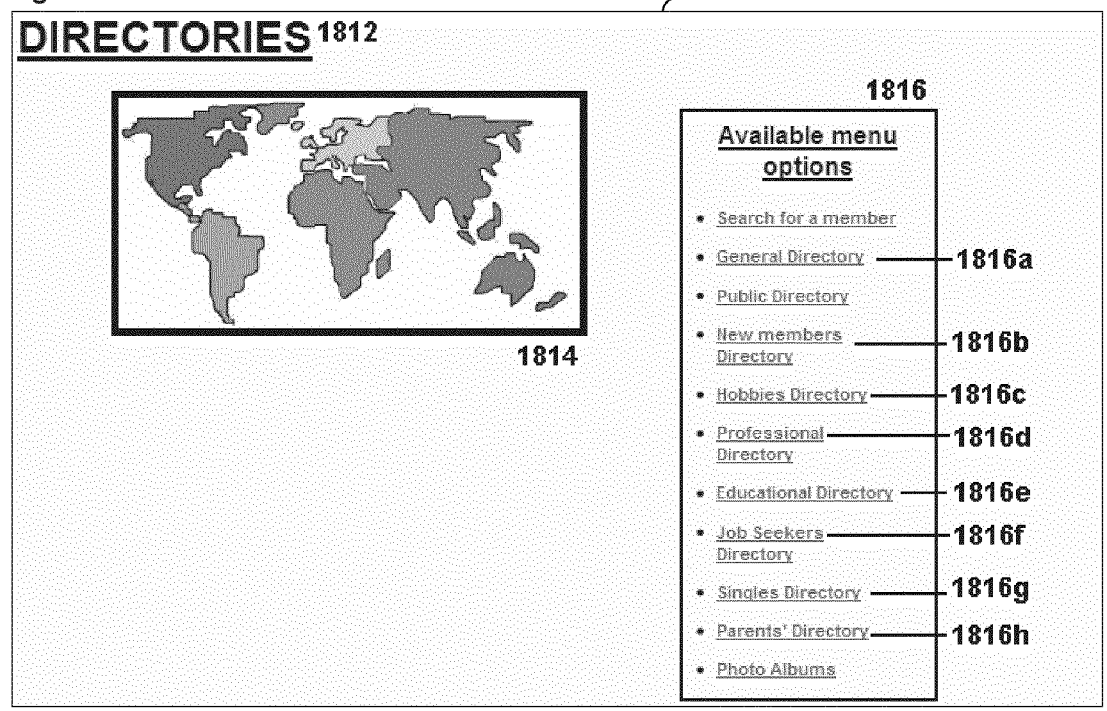
FIG. 18 is a further page view showing a graphical and listing directory.

FIG. 18 illustrates a variety of menu options in page view 1810 bearing title 1812 Directories. A map 1814 shows geographic regions which the member can select to look-up members by location. The platform further includes directories by specialty 1816 of the users on the platform: (a) The general directory 1816a stores the descriptive data of the all users. (b) The professional directory 1816b collects all users professional information current and historical. (c) The directory of new members 1816c lists the new users on the platform. (d) Other directories by categories display the users under common hobbies 1816d or education 1816e, if they are job seekers 1816f, singles 1816g or parents 1816h.

If a member clicks on the New Members Directory 1816c, they will be presented with page view 1910 having a title 1912 New Members Directory, as shown in FIG. 19. The page includes a heading 1914 indicating the number of new members, for example, members that have signed up within the last three months. A new member table 1916 includes a header 1918 with five columns, namely, Member, Since, Region, Email and Profile. The rows 1920 show the names and, as a non-limiting example, New York or Paris as the region. In a corporate environment, column 2 could show the year an employee joined the company, and the third column could list their department or division. The fourth column provides a link to email that new member. The fifth column provides a link to that new member's profile.

To check email, a member would be presented with the page view 2010 having a title My Entails, as shown in FIG. 20. A chart 2014 shows email statistics, for example, total number of messages, total messages received, total messages sent, number of messages deleted. Each row contains a link to the mailbox, inbox, outbox and trash, respectively. By selecting the mailbox link, a table listing 2016 showing the mailbox contents would be displayed. The legend. 2018 shows symbols that are used to code various pieces of email. The header 2020 has 7 column headings, namely, a check box, Date, Status, Read, From, To and Subject. The rows 2022 list the individual emails in the mailbox, inbox, outbox or trash depending on the members selection.

The submission of ads as mentioned above, is organized by an Ad Management System accessed via page view 2110 as shown in FIG. 21. Previously created or submitted ads can be searched by a form box 2112 which collects data about the ad category, publish date, ad date and/or location. A search link then activates the search. Search results are presented in an Ad Table 2116. The table header 2118 has six exemplary columns, namely, Ad Title, City/Region, Category, Ad Date, Submit Date and See. The rows 2120 show the ad identification data, and include a link to the ad itself.

Figures 23, 24:
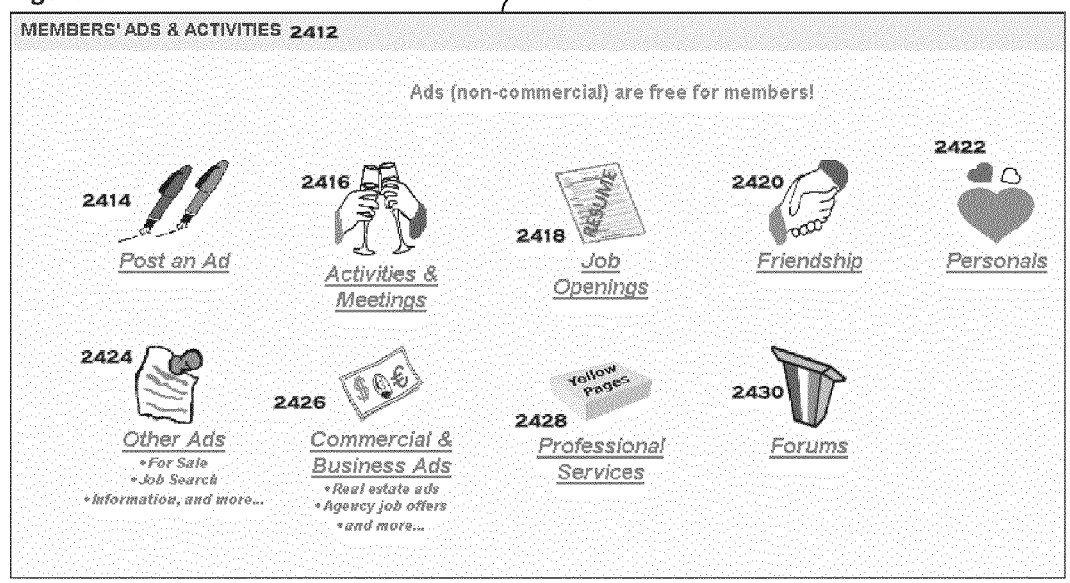
FIG. 23 is a further page view showing an Upload Picture Interface.
FIG. 24 is an additional page view showing Members Ads and Activities.

The submission of photos mentioned above, is organized by a picture upload interface accessed via page view 2310 having a title 2312 Upload My Pictures as shown in FIG. 23. A photo table 2316 includes a header 2318 having three columns, namely, Photo files, Minimum privilege and Display Rank. The rows 2320 have form boxes to allow the user to select photo files, minimum privilege level and display rank, Once a row has been completed an Upload function 2322 can be selected to copy the photo file from the local device to the database containing the users account information, A Reset function 2324 can be activated to clear the fields in rows 2320.

A control panel to access a variety of functions is illustrated in page view 2410 as shown in FIG. 24 having a title 2412 Members' Ads & Activities. The panel has exemplary links as follows: Post an Ad 2414; Activities & Meetings 2416; Job Openings 2418; Friendship 2420; Personals 2422; Other Ads (For Sate, Job Search, Information and more . . . ) 2424; Commercials & Business Ads (Real Estate ads, Agency job offers, and more . . . ) 2426; Professional Services 2428; and Forums 2430.

The invention relates generally to the field of internet and computerized social networking. More particularly, the invention relates to methods and systems of allowing users:

A. To take control of their personal and contributed information on a social networking website. The method enables users to manage their social and personal connections in ways that protect their privacy requirements and in a manner that clearly distinguish the intensity and intimacy with other users. The method enables users to limit access to their personal and contributed information to only some users categorized by their immediate level of intimacy.

Members are able to manage the sharing of contributed information among a plurality of users of an online social relationship network through a system and method having a private computer network. The private computer network includes a server and database which are accessible by members of the social network. The server receives information from contributing member(s) and provides information to a requesting user(s). The database is operatively coupled to the server for storing items of information about the contributing member. The term "user" is used to readily distinguish that requesting entity from the contributing entity. However, the terms, user, friends, recommending members, recommended members, rating members and rated members all refer to members of the social network. The various names and titles used herein generally refer to the functional attribute assigned to a member to describe or claim a particular feature of the invention.

The server, the database and the set of instructions are maintained on the private computer network. The members and users access the private computer network via the public computer network. A set of instructions is stored in an electronic storage medium for programming the server to (i) allow the contributing member to assign a different privilege level for each item of information on a first sliding scale having at least three levels and (ii) allow the contributing member to grant a privilege level to a requesting user on a corresponding second sliding scale having at least three levels. Upon receiving an information request from the requesting user, the server retrieves all items of information about the contributing member and selectively displays those items of information which have been assigned a privilege level matching or less than the privilege level granted to the requesting member.

The assigned privilege levels may consist of 5 levels, for example, low, low-medium, medium, med-high and high. This sliding scale allows the contributing member to associate an immediate level of intimacy with their personal information. For example, a contributing member may consider their hometown, date of high school graduation, college attended, birth date, or photographs as personal information. As in real life, the contributing member may reveal their hometown to almost all acquaintances, their date of high school graduation to casual friends, their college to professional contacts, their birth date to close friends, and their photographs only to family and relative. In the invention, the hometown is assigned a privilege level of low, the date of high school graduation a privilege level of low-medium, the college a privilege level of medium, their birth date a privilege level of med-high and their photographs as high.

Accordingly, the privilege levels described herein provides a level of granularity that comprises an ability to assign privilege levels for each item or field of information. When a contributing member has a family member admitted as a friend, they can directly grant a high privilege level. When that family member functionally operates as a requesting user, they will have displayed all information since all assigned privilege levels will be matching or less than the granted high privilege level.

When a contributing member has a fellow alumnus admitted as a friend, they can directly, indirectly or through inheritance via an alumni group or network, grant a medium privilege level. When that fellow alumnus operates as a requesting user, they will have displayed certain information that includes an assigned privilege level (low, low-med, med) that is matching or less than the granted medium privilege level.

When an unknown third party joins a group, they will be granted the lowest privilege level in the chain between the contributing member and the third party. When that third party operates as a requesting user, they will have displayed certain information that includes an assigned low privilege level that is matching [or less than] the granted low privilege level.

The database further includes a record having fields and field titles for each contributing member, wherein each item of information is stored in a field of the record. Upon an information request from the requesting user, all fields titles are displayed and the fields are selectively populated based on the assigned privilege level being equal or less than the granted privilege level.

B. To control, organize, classify, and categorize their social connections. The method allows users to link with other users in many and various types of configurations across many independent; specific, identifiable and exclusive networks. The method allows a user to protect his contacts from sharing unwanted connections with other users in his/her network.

Figure 25:
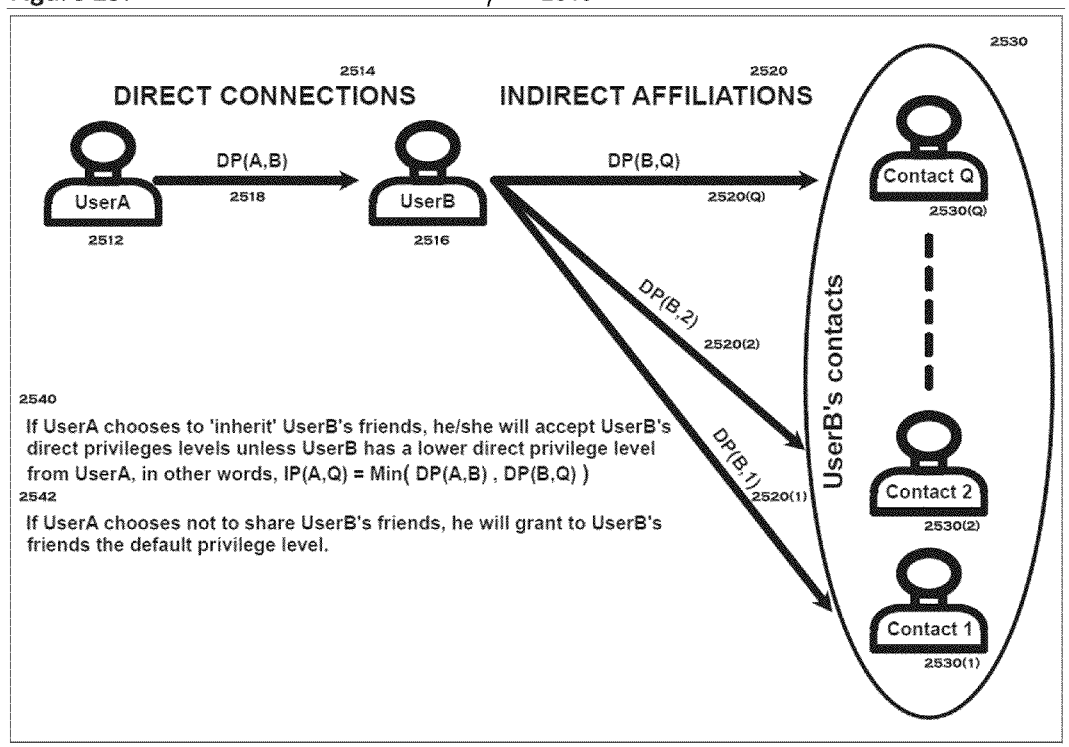
FIG. 25 is a diagram showing inherited privilege levels with indirect affiliations.

The contributing member may grant a privilege level to a requesting user in a variety of ways. A means for direct privilege granting [see reference numeral 350 in FIG. 3; see reference numeral 450 in FIG. 4] may occur when the contributing member accepts the requesting user as a friend and grants a direct privilege level. The requesting user is able to selectively see the contributing member's items of information based on the assigned privilege level being equal or less than the granted direct privilege level. A schematic representation of privilege level adoption is shown in page view 2510 of FIG. 25. The DP designation stands for Direct Privilege and the IP designation stands for Inherited Privilege. User A (2512) has formed a Direct Connection 2514 with User B (2516), which establishes a Direct Privilege Level between A and B, designated as DP(A,B) with reference numeral 2518. User A has Indirect Affiliations 2520 with B's contacts. B's contacts are generally referred to as 2530 and include Contacts 1, 2, . . . Q, B's Direct Privilege relationship with Contact 12530(1) is designated as DP(B,1) 2520(1). B's Direct Privilege relationship with Contact 2 2530(2) is designated as DP(B,2). B's Direct Privilege relationship with Contact Q 2530(Q) is designated as DP(B,Q) 2520(Q). As described in 2540, User B's contacts can be granted an indirect privilege level from User A by way of inheritance. If User A chooses to 'inherit' User B's friends, he will accept User B's direct privilege levels unless User B has a lower direct privilege level from User A. That is A will acquire an Inherited Privilege with Q that is the lower of (i) the Direct Privilege between A and B and (ii) the Direct Privilege between B and Q, in other words, IP(A,Q)=Min [DP(A,B) DP(B,Q)]. As described in 2542, If User A chooses not to share User B's friends, he will grant to User B's friends the default privilege level.

Figure 4:
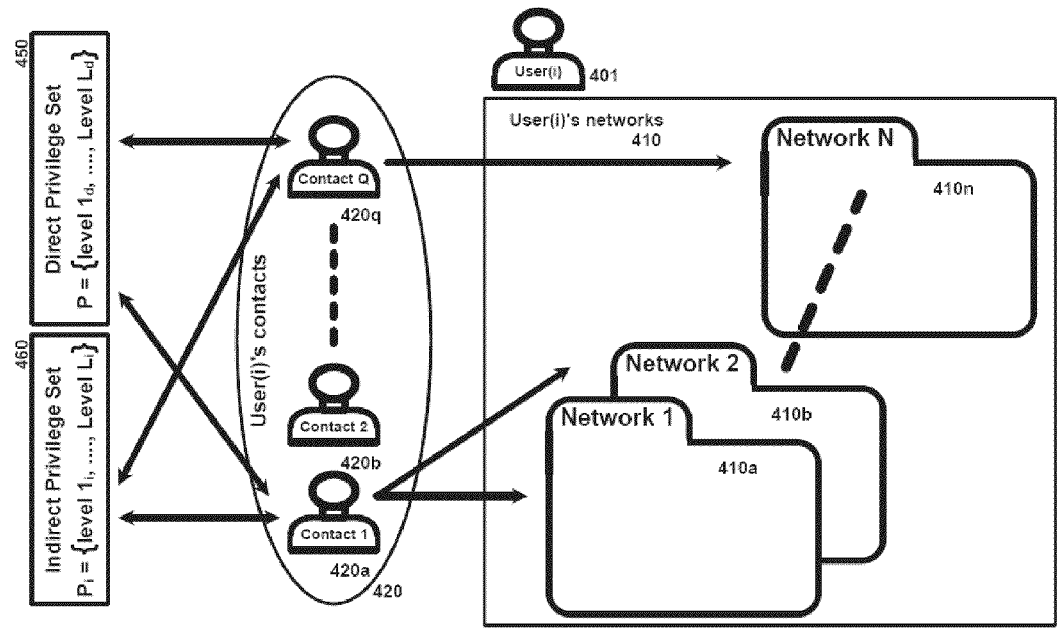
FIG. 4 is a schematic diagram showing how privilege levels are assigned and contacts grouped in a plurality of independent networks.

The contributing member may indirectly grant a group privilege level to all friends of friends [see reference numeral 340 in FIG. 3; see reference numeral 460 in FIG. 4]. Indirect relationships are potential contacts generated by virtue of commonality; when a friend or a member shares his/her connections, Friends of the requesting user inherit the lowest privilege level in the chain from contributing member to requesting user to one or more friends. The friends of the requesting user are able to selectively see the contributing member's items of information based on the assigned privilege level being equal or less than the granted group privilege level.

The contributing member joins a network and grants a network privilege level to the network [see reference 360 in FIG. 3]. All members of the network are able to see the contributing members identity and all members of the network are able to selectively see the contributing member's items of information based on the assigned privilege level being equal or less than the granted network privilege level.

One of the networks comprises a group of separate unconnected individuals. This group is referred to as the "singleton" group. So for friends that do not fit into existing groups like professional contacts, alumni, or family, the singleton group provides a category. Previously, these unconnected individuals would each be considered a group unto themselves. With the singleton group, they can be aggregated in to just one group.

Accordingly, when a member has a group of new friends, those friends do not have the same privilege level as each other. As a model of intimacy levels in real life, the contributing member is able to filter and control the access to their items of information. At any time the contributing member can revert to an item of information and change its privilege level. If the privilege level of an item of information was raised to med-high from low-med, any requesting users with a privilege level of medium and low-medium would now be denied access to that information item. That information item can be one field of information, for example a date of graduation. On the other hand, if the privilege level of an item of information was lowered to low from medium, any requesting user with a privilege level of low and low-medium, who previously was denied access, would now be granted access. Accordingly, the level of granularity addresses individual items of information, while the access level can be instantly changed with affect on all contacts, groups and requesting users.

As a corollary, if a contributing member changes her mind about a contact's friends, they can change the privilege level afforded to users who are 'friends' of my contacts. Since a requesting user inherits the lowest privilege level in the chain, all members who are in the contact list of the immediate contact will have an immediate reduction in their privilege level. In addition, if the immediate contact introduces new members which would now be indirectly connected to the original contributing member, they would also have a correspondingly reduced privilege level.

C. To create exclusive and simultaneous communication channels or boards with relevant users in their contact list. The system further includes a grod which we define as a group communication or group board. A member can create a grod and attach it to a group or network. In a grod, any member of a particular group can participate in the discussion, but the discussion is closed to other members who are not members of the group. To draw an analogy, it can be said that a grod is akin to a restricted blog.

D. To obtain popularity and consultation feedback about themselves and their submitted content. The method allows users to gather feedbacks, ratings, recommendations, and consultations statistics over a wide range of networking activities that enable them to discover; learn, improve upon their sociability skills.

The system further includes recommending members, recommended members, rating members and rated members. A recommendation that is provided by a recommending member about a recommended member is public along with the identity of the recommending member. In contrast, a rating provided by a rating member about a rated member is private, with three or more ratings being compiled and displayed to the rated member as an average of the compiled ratings.

E. To manage a complex privilege level based contact book on a multi-lateral system. The complexity of such a system can grow exponentially as the number of members increases in the database. The system further includes a central profile database and several private computer networks. Multiple social networks exist on the several private computer networks. For example, a business social network and college alumni networks can run on a private computer network in Massachusetts. A dining social network and travel social network can be set up on a private computer network in New York. A contributing member has their contributed information on the central profile database, where the central profile database may be stored on a server in Connecticut, and linked to the several social networks and their private computer networks in Massachusetts and New York. A member that is part of the college alumni group in Massachusetts may subsequently join the travel social network in New York. That member can easily join without having the re-enter their contributed information.

The invention includes a service where user can grant other users in their networks privilege levels. Members can create their own defined policy for access to their personal and contributed information. The invention includes a method for determining the level of relationship between a user and other members in the networks and providing a user with comprehensive mapping of his/her relationships within the social network.

The system further includes a page view comprising contacts by networks and displaying all networks to which the contributing member belongs to. Each displayed network includes a corresponding link which maps a network listing to a listing of members within the network, wherein the link connects the contributing member to a listing of all members in the corresponding network.

While certain details have been shown and described with respect to hardware, system, and process steps, it should be understood that other options and variations may be incorporated within the spirit of the invention. Various storage devices, computer systems, software applications and telecommunications links may be used. The items of information can be captured by a variety of devices and communicated to the private computer network by all current and future telecommunications means.

The elements shown in the Figures may be implemented in various forms of hardware, software or combinations thereof. Preferably, these elements are implemented in software on one or more appropriately programmed general-purpose digital computers having a processor and memory and input/output interfaces.

Implementations of the present principles can take the form of an entirely hardware embodiment, an entirely software embodiment or an embodiment including both hardware and software elements. Certain aspects of the present invention involving data processing, sorting, comparing and identification steps are implemented in software, which includes but is not limited to firmware, resident software, microcode, etc.

The present principles may be implemented and can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to a server and memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers, servers or storage devices through intervening private or public networks. Modems, cable modem and Ethernet cards are just a few of the currently available types of network adapters.

Having described preferred embodiments for processes, apparatus and systems used therein for managing the sharing of contributed information in online social networks (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A computer system for facilitating sharing, over a communications network, of social network account data, comprising:
   a database storage device for storing a first user's social network account data comprising profile data, relationship data and privilege data, wherein profile data comprises at least the first user's name and location, relationship data comprises connections with other users representing social relationships, and privilege data comprises a privilege level required for viewing each piece of data in the first user's social network account and a list of privileges granted to other users, wherein each privilege level defines whether said other user may view an individual piece of data in the first user's social network account;
   a server communicatively connected to the database storage device, the server including a memory device, a network interface device communicatively coupled with the communications network, and a processor configured for:
      providing, over the communications network, a graphical user interface to the first user for defining a set of different privilege levels required to view each piece of data in the first user's social network account, wherein there are at least three different privilege levels;
      receiving, over the communications network, a request from a second user to enter into a social relationship with the first user;
      providing, over the communications network, a graphical user interface to the first user for granting a set of privilege levels, based on one of direct privilege method, indirect privilege method, and group privilege method, to the second user for allowing access to each piece of data in the first user's social network account when a user privilege level is greater than or equal to a required privilege level for a piece of data, wherein a direct privilege method comprises granting a privilege level directly to a requesting user from another user, wherein an indirect privilege method comprises granting inherited privilege level to a requesting user by another user or granting a default privilege level if non-inherited, and wherein a group privilege method comprises assigning a privilege level to a group of users by another user;
      wherein the first user granting the inherited privilege level to a third user that is equal to a minimum of the set of privilege levels granted to the second user by the first user and a set of privilege levels granted by the second user to the third user, wherein the set of privilege levels granted to the second user by the first user is distinct from the set of privilege levels granted by the second user to the third user, and wherein the third user has a social relationship with the second user, but no relationship with the first user;
      generating an access authorization for the second user, wherein the access authorization comprises a comparison of the set of privilege levels received by the second user, compared with the set of privilege levels defined by the first user as being required for viewing each piece of data in the first user's social network account;
      generating an access authorization for the third user, wherein the access authorization comprises a comparison of the set of privilege levels received by the third user, compared with the set of privilege levels defined by the first user as being required for viewing each piece of data in the first user's social network account;
      providing, over the communications network, a graphical user interface to the second user, wherein, according to the access authorization of the second user, the graphical user interface displays only those pieces of data in the first user's social network account that have a privilege level that is equal to or less than the privilege level was granted to the second user for said pieces of data; and
      providing, over the communications network, a graphical user interface to the third user, wherein, according to the access authorization of the third user, the graphical user interface displays only those pieces of data in the first user's social network account that have a privilege level that is equal to or less than the privilege level that was inherited by the third user from the second user for said pieces of data.

2. The computer system of claim 1, wherein the processor is further configured for:
   providing, over the communications network, a graphical user interface to the first user for defining a privilege level granted to a fourth user that has a social relationship with the second user, but no relationship with the first user, wherein the privilege level granted to the fourth user is distinct from the privilege level granted to the second user.

3. The computer system of claim 2, wherein the processor is further configured for:
   providing, over the communications network, a graphical user interface to the fourth user, wherein the graphical user interface displays only those pieces of data in the first user's social network account that have a privilege level that is equal to or less than the privilege level granted to the fourth user.

4. The computer system of claim 3, wherein the processor is further configured for:
   providing, over the communications network, a graphical user interface to a plurality of users, the graphical user interface for reading and storing ratings from the plurality of users about a specific user.

5. The computer system of claim 4, wherein the processor is further configured for:
providing, over the communications network, a graphical user interface to the plurality of users, the graphical user interface for displaying a compilation of three or more ratings from the plurality of users about the specific user.

6. The computer system of claim 5, wherein the profile data further comprises an identification of a group or groups of which the first user is a member and wherein the processor is further configured to allow the first user to grant all members of such groups a specific group privilege level.

7. The computer system of claim 1, wherein the processor is further configured for:
providing, over the communications network, a graphical user interface to the first user to allow the first user to arrange and segregate his/her contacts in overlapping or segregated groups, such that the first user's connections with other users are shared only among members of the same groups, and to make available a singleton group allowing the first user not to share any of her/his connections with other users within the singleton group.

8. The computer system of claim 1, wherein the processor is further configured for:
providing, over the communications network, a graphical user interface to the first user so as to display interactive social networking feedback including ratings, recommendations and blames by other users, as well as detailed consultation statistics about the first user and her/his submitted content.

9. The computer system of claim 1, wherein the processor is further configured for:
providing, over the communications network, a graphical user interface to the first user to conduct private group communications with his/her connections with other users, such that only the users belonging to a group selected by the first user can participate in the group communication.

10. A method on a server for facilitating sharing, over a communications network, of social network account data, comprising:
storing a first user's social network account data comprising profile data, relationship data and privilege data, wherein profile data comprises at least the first user's name and location, relationship data comprises connections with other users representing social relationships, and privilege data comprises a privilege level required for viewing each piece of data in the first user's social network account and a list of privileges granted to other users, wherein each privilege level defines whether said other user may view an individual piece of data in the first user's social network account;
providing, over the communications network, a graphical user interface to the first user for defining a set of different privilege levels required to view each piece of data in the first user's social network account, wherein there are at least three different privilege levels;
receiving, over the communications network, a request from a second user to enter into a social relationship with the first user;
providing, over the communications network, a graphical user interface to the first user for granting a set of privilege levels, based on one of direct privilege method, indirect privilege method, and group privilege method, to the second user for allowing access to each piece of data in the first user's social network account when a user privilege level is greater than or equal to a required privilege level for a piece of data, wherein a direct privilege method comprises granting a privilege level directly to a requesting user from another user, wherein an indirect privilege method comprises granting inherited privilege level to a requesting user by another user or granting a default privilege level if non-inherited, and wherein a group privilege method comprises assigning a privilege level to a group of users by another user;
wherein the first user granting the inherited privilege level to a third user that is equal to a minimum of the set of privilege levels granted to the second user by the first user and a privilege level granted by the second user to the third user, wherein the set of privilege levels granted to the second user by the first user is distinct from the set of privilege levels granted by the second user to the third user, and wherein the third user has a social relationship with the second user, but no relationship with the first user;
generating an access authorization for the second user, wherein the access authorization comprises a comparison of the set of privilege levels received by the second user, compared with the set of privilege levels defined by the first user as being required for viewing each piece of data in the first user's social network account;
generating an access authorization for the third user, wherein the access authorization comprises a comparison of the set of privilege levels received by the third user, compared with the set of privilege levels defined by the first user as being required for viewing each piece of data in the first user's social network account;
providing, over the communications network, a graphical user interface to the second user, wherein, according to the access authorization of the second user, the graphical user interface displays only those pieces of data in the first user's social network account that have a privilege level that is equal to or less than the privilege level was granted to the second user for said pieces of data; and
providing, over the communications network, a graphical user interface to the third user, wherein, according to the access authorization of the third user, the graphical user interface displays only those pieces of data in the first user's social network account that have a privilege level that is equal to or less than the privilege level that was inherited by the third user from the second user for said pieces of data.

11. The method of claim 10, further comprising the step of:
providing, over the communications network, a graphical user interface to the first user for defining a privilege level granted to a fourth user that has a social relationship with the second user, but no relationship with the first user, wherein the privilege level granted to the fourth user is distinct from the privilege level granted to the second user.

12. The method of claim 11, further comprising the step of:
providing, over the communications network, a graphical user interface to the fourth user, wherein the graphical user interface displays only those pieces of data in the first user's social network account that have a privilege level that is equal to or less than the privilege level was granted to the fourth user.

13. The method of claim 12, further comprising the step of:
providing, over the communications network, a graphical user interface to a plurality of users, the graphical user interface for reading and storing ratings from the plurality of users about a specific user.

14. The method of claim 13, further comprising the step of:
providing, over the communications network, a graphical user interface to the plurality of users, the graphical user interface for displaying a compilation of three or more ratings from the plurality of users about the specific user.

* * * * *